(12) United States Patent  (10) Patent No.: US 8,257,673 B2
Ripperger  (45) Date of Patent: Sep. 4, 2012

(54) PROCESS FOR REMOVING SULFUR FROM SEPARATE LESS REACTIVE AND MORE REACTIVE FUEL GAS STREAMS CONTAINING ORGANIC SULFUR AND LIGHT OLEFINS

(75) Inventor: Gary Lee Ripperger, Houston, TX (US)

(73) Assignee: Shell Oil Company, Houston, TX (US)

( * ) Notice: Subject to any disclaimer, the term of this patent is extended or adjusted under 35 U.S.C. 154(b) by 849 days.

(21) Appl. No.: 12/126,372

(22) Filed: May 23, 2008

(65) Prior Publication Data

US 2009/0050534 A1  Feb. 26, 2009

Related U.S. Application Data

(60) Provisional application No. 60/940,221, filed on May 25, 2007.

(51) Int. Cl.
*B01D 53/52* (2006.01)
(52) U.S. Cl. ............... 423/242.1; 423/220; 423/226; 423/230; 423/244.09; 423/244.01; 585/250; 585/258; 208/208 R; 208/209; 208/210; 208/211; 208/213; 208/218
(58) Field of Classification Search .......... 423/220, 423/230, 226, 242.1, 242.2, 244.01, 244.05, 423/244.09; 585/250, 258; 208/210, 209, 208/208 R, 211, 213, 218
See application file for complete search history.

(56) References Cited

U.S. PATENT DOCUMENTS

| | | | |
|---|---|---|---|
| 2,434,868 A | 1/1948 | Sample et al. | 196/30 |
| 3,428,429 A | 2/1969 | Carson | 23/212 |
| 3,523,009 A | 8/1970 | Weiss | 23/92 |
| 3,730,694 A | 5/1973 | Wunderlich | 48/213 |
| 3,966,875 A | 6/1976 | Bratzler et al. | 423/220 |
| 4,153,671 A | 5/1979 | Clements et al. | 423/244 |
| 4,153,674 A | 5/1979 | Verloop et al. | 423/573 R |
| 4,491,516 A | 1/1985 | Polleck et al. | 208/248 |
| 4,505,881 A | 3/1985 | Diaz | 423/236 |
| 4,508,693 A | 4/1985 | Diaz | 423/236 |
| 4,545,976 A | 10/1985 | Osman | 423/650 |
| 5,124,140 A | 6/1992 | Okada et al. | 423/650 |
| 5,401,391 A | 3/1995 | Collins et al. | 208/208 R |
| 5,482,617 A | 1/1996 | Collins et al. | 208/227 |

(Continued)

FOREIGN PATENT DOCUMENTS

CN  1195640  10/1998

(Continued)

OTHER PUBLICATIONS

U.S. Appl. No. 12/101,036, filed Apr. 10, 2008.

*Primary Examiner* — Jerry A. Lorengo
*Assistant Examiner* — Pritesh Darji

(57) ABSTRACT

Disclosed is a process for removing organic sulfur from more than one reactive fuel gas stream. A reactor vessel that is provided with at least one bed of hydrodesulfurization catalyst is used to hydrodesulfurize multiple reactive fuel gas streams with a less reactive fuel gas stream being introduced into the reactor vessel at a point above the introduction point of a more reactive fuel gas stream. An hydrotreated fuel gas is yielded from the reactor vessel having a hydrogen sulfide concentration and a low organic sulfur content.

14 Claims, 1 Drawing Sheet

U.S. PATENT DOCUMENTS

| | | | |
|---|---|---|---|
| 6,083,378 A * | 7/2000 | Gildert et al. | 208/209 |
| 6,113,776 A | 9/2000 | Upson | 208/113 |
| 6,231,753 B1 | 5/2001 | McKnight et al. | 208/217 |
| 6,444,118 B1 * | 9/2002 | Podrebarac et al. | 208/210 |
| 6,533,255 B1 | 3/2003 | Mitsuhashi et al. | 261/149 |
| 7,037,485 B1 | 5/2006 | Drnevich et al. | 423/652 |
| 2004/0000507 A1 | 1/2004 | De Almeida et al. | 208/213 |
| 2004/0026298 A1 * | 2/2004 | Ellis et al. | 208/210 |
| 2004/0055935 A1 | 3/2004 | Bakshi | 208/213 |
| 2006/0118465 A1 | 6/2006 | De Lasa | 208/208 R |
| 2006/0278567 A1 * | 12/2006 | Ellis et al. | 208/208 R |
| 2007/0134147 A1 * | 6/2007 | Graville | 423/242.1 |

FOREIGN PATENT DOCUMENTS

| | | |
|---|---|---|
| EP | 1690587 | 8/2006 |
| GB | 1044771 | 10/1966 |
| JP | 03033191 | 2/1991 |
| WO | WO9807502 | 2/1998 |
| WO | WO2006013206 | 2/2006 |
| WO | WO2006125759 | 11/2006 |

* cited by examiner

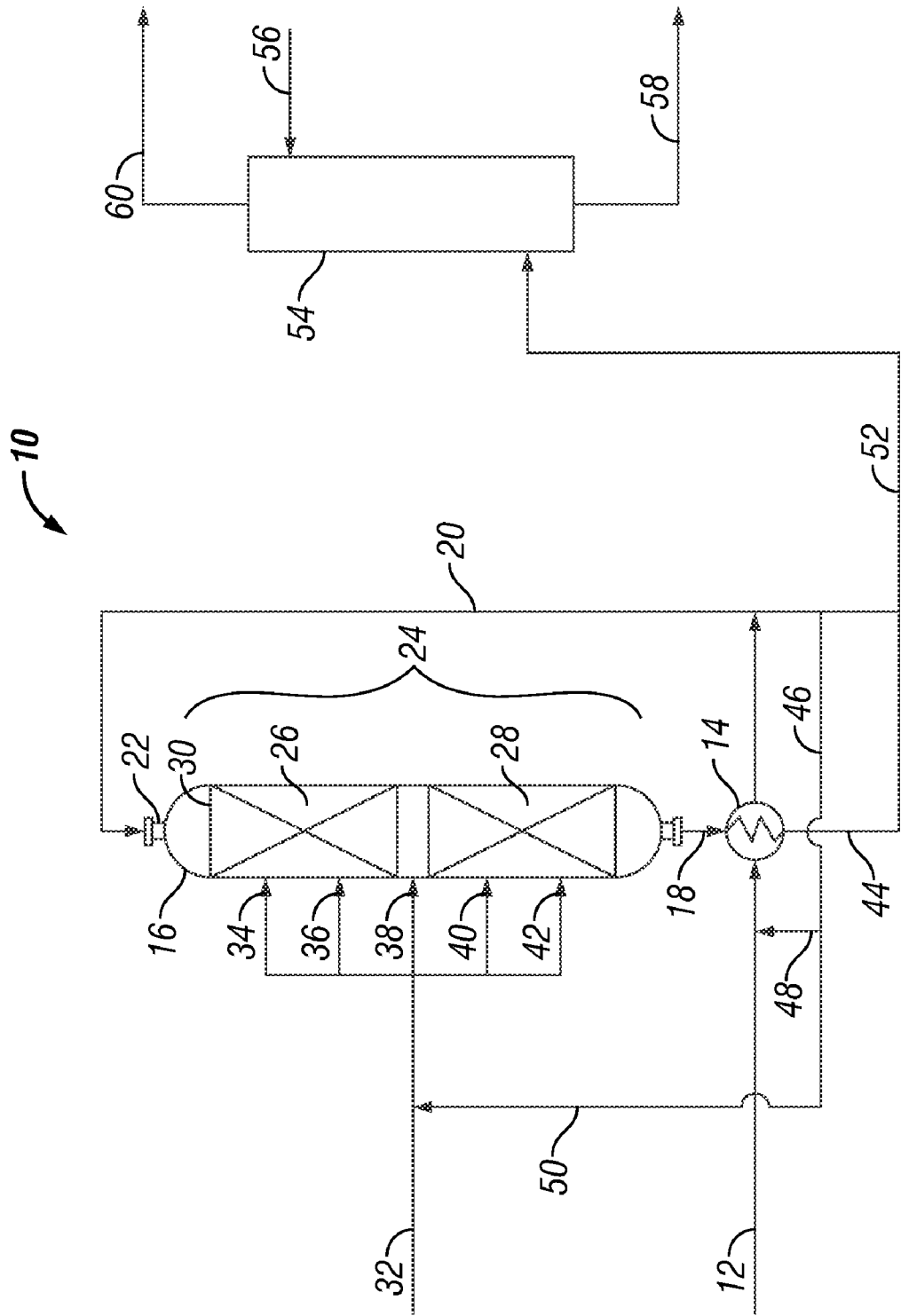

PROCESS FOR REMOVING SULFUR FROM SEPARATE LESS REACTIVE AND MORE REACTIVE FUEL GAS STREAMS CONTAINING ORGANIC SULFUR AND LIGHT OLEFINS

This application claims the benefit of U.S. Provisional Application No. 60/940,221 filed May 25, 2007, the entire disclosure of which is hereby incorporated by reference.

This invention relates to a process for removing sulfur from multiple fuel gas streams of different reactivity.

There are presently federal regulations that impose certain maximum total sulfur concentration limits on refinery fuel gas streams and there is a trend in certain states and municipalities toward the imposition of even more stringent sulfur requirements for these streams. Among the various approaches that are useful in removing sulfur from refinery fuel gas streams to meet the sulfur regulations, caustic scrubbing and absorption methods are typically used. However, with the significantly lower limits that are being placed on the amount of total sulfur that may be contained within a refinery fuel gas stream, these methods tend to be unsuitable for providing treated refinery fuel gas streams that meet the lower sulfur concentration requirements. Certain of the refinery fuel gas streams such as a coker unit dry gas or a fluid catalytic cracking unit gas can contain concentrations of carbonyl sulfide (COS) and other sulfur compounds that are difficult to acceptably be removed therefrom by traditional caustic or absorption scrubbing and other methods to the lower sulfur concentration levels required by the newer regulations.

One inventive process proposed for use in the removal of sulfur from fuel gas streams that contain organic sulfur and significant concentrations of light olefins is that as described and claimed in U.S. provisional application No. 60/911,422, filed 12 Apr. 2007, entitled "A Process for Removing Sulfur From a Fuel Gas Stream," which application is incorporated herein by reference. In this process, highly reactive fuel gas streams that contain significant amounts of light olefin compounds are processed by a catalytic hydrotreating method. The disclosure recognizes the highly exothermic nature of the olefin hydrogenation reaction and notes that it is this attribute of the olefin saturation reaction that causes problems with the hydrotreating of olefin-containing fuel gas streams such as those found in crude oil refinery processes.

It is recognized herein that another problem with the catalytic hydrotreating of refinery fuel gas streams is associated with the types of olefins contained in them. Typically, the refinery gas streams contain olefins that are predominantly the lighter olefins of ethylene and propylene, and, because there is not a wide range of olefins of various molecular weights and reactivity contained in the fuel gas stream to be hydrotreated, when it comes into contact with the hydrotreating catalyst of a hydrotreating reactor, most of the saturation reactions will occur very close to the initial layers of the catalyst bed to which the fuel gas stream is contacted. Thus, the highly exothermic olefin saturation reactions do not occur throughout the catalyst bed of a reactor, but, instead, the reactions will be localized near to top layers (in a down-flow reactor) of the catalyst bed. This localization of the saturation reaction makes it difficult to handle the temperature rise across the reactor bed and it causes inefficient use of all the catalyst of the reactor bed.

It is, thus, desirable to have a process that can more effectively handle the hydrotreating of a fuel gas stream having a concentration of light olefins and, in particular, effectively handle the localization of heat release that results from the catalytic saturation of a narrow range of light olefins that are contained in a fuel gas stream that is being hydrotreated.

Accordingly, provided is a process for removing sulfur from more than one fuel gas stream, wherein said process comprises: providing an elongated reactor vessel having a length and containing a bed of a hydrodesulfurization catalyst; introducing a less reactive fuel gas stream at a first introduction point into said elongated reactor vessel, wherein said less reactive fuel gas stream is contacted with said hydrodesulfurization catalyst under hydrodesulfurization process conditions; introducing a more reactive fuel gas stream at a second introduction point into said elongated reactor vessel at a location along said length of said elongated reactor vessel that is below said first introduction point; and yielding from said elongated reactor vessel a reactor effluent containing $H_2S$.

FIG. 1 is a process flow schematic that presents one or more embodiments of the inventive process for removing sulfur from more than one reactive fuel gas stream that contains organic sulfur and light olefins.

The invention relates to the processing of reactive fuel gas streams that contain concentrations of both organic sulfur compounds and light olefins. When referring herein to a fuel gas stream as being reactive, what is meant is that it contains a concentration of at least one light olefin. The relative reactivity of the various fuel gas streams is based herein on their relative concentrations of a light olefins. Thus, a less reactive fuel gas stream having a low concentration of a light olefin will be less reactive than a more reactive fuel gas stream having a higher concentration of light olefin than the low concentration of light olefin of the less reactive fuel gas stream. While it is recognized that this definition of reactivity of a fuel gas stream does not consider other reactive components that may be contained in the fuel gas stream, such as the organic sulfur compounds, one of the reasons for this is that the organic sulfur species contained in a fuel gas stream to be processed by the inventive process are thought to be more varied and, thus, they will tend to react throughout and along the length of the hydrotreating catalyst bed as the fuel gas stream passes and traverses through it instead of reacting in a small localized area within the catalyst bed. Another reason is that some of the fuel gas streams to be treated using the inventive process are contemplated to have exceptionally high concentrations of light olefins that release exceptionally high amounts of heat upon their hydrogenation when contacted with a hydrotreating catalyst under hydrotreating conditions.

The inventive process is particularly suited for the processing of refinery fuel gas streams that are yielded from any of the numerous process units of a crude oil refinery. And, while it is contemplated in the application of the inventive process that certain of the individual streams among the many refinery fuel gas streams to be processed may be combined to form a single stream as a feed to the inventive process, one novelty of the invention is its application in the treatment of a multiplicity of refinery fuel gas streams by keeping the more reactive fuel gas streams segregated from the less reactive fuel gas streams when charging them as separate feeds to the inventive process. For example, the more reactive, high light olefin content gas streams generated by the conversion units such as a delayed coker unit, e.g. a coker dry gas and coker propylene vapor, and a fluid catalytic cracking unit, e.g. an FCC dry gas, will remain segregated from the typically less reactive gas streams generated by a flare gas recovery system, tank vents, and vapor overheads from crude unit atmospheric and vacuum towers. All these streams, however, can have significant concentrations of organic sulfur compounds, including those which can be difficult to remove by the use of conventional methods, particularly, to the significantly lower concentration levels required by newer, more stringent sulfur regulations.

In the inventive process, the processing of the fuel gas streams includes the use of an elongated reactor vessel having a length and which contains at least one bed of hydrodesulfurization catalyst. The inside wall of the elongated reactor vessel defines a volume that is filled with hydrodesulfurization catalyst that form the bed of catalyst which may be defined in terms of a bed height that is measured from the bottom surface of the bed of catalyst to the top surface of the bed of catalyst. The elongated reactor vessel may further include within it additional separate beds of catalyst that are placed therein along its length. For instance, the elongated reactor vessel can include within its volume more than one, or at least two, separate catalyst beds, including a first upper catalyst bed and a second lower catalyst bed. In a hydrodesulfurization reactor vessel that is elongated in the vertical direction, the first upper catalyst bed is placed at a relative location within the reactor vessel that is above the placement of the second lower catalyst bed within the reactor vessel. The first upper catalyst bed can comprise a first hydrodesulfurization catalyst, and the second lower catalyst bed can comprise a second hydrodesulfurization catalyst.

An important feature of the inventive process is for the less reactive fuel gas stream to be introduced into the elongated reactor vessel at a first introduction point that is located above the second introduction point of the more reactive fuel gas stream. With these relative locations of the two introduction points, as the less reactive fuel gas stream passes through the bed of hydrodesulfurization catalyst the light olefins contained in the less reactive fuel gas stream will react and become saturated with hydrogen prior to the resulting stream coming into contact with the more reactive fuel gas stream that is being introduced into the elongated reactor vessel at the location of the second introduction point.

One benefit of this arrangement is that the less reactive fuel gas stream becomes non-reactive as a result of the hydrogenation of the light olefins contained therein. This hydrogenated, less reactive fuel gas stream, or non-reactive fuel gas stream, is then mixed with the more reactive fuel gas stream at a location further down the length of the bed of catalyst. The hydrogenated, less reactive fuel gas stream, thus, serves as a diluent of the more reactive fuel gas stream. Also, it is desirable for the introduction temperature of the more reactive fuel gas stream to be lower than the introduction temperature of the less reactive fuel gas stream so that it can serve as a quench stream for reducing the temperature of the hydrogenated, less reactive fuel gas stream, especially, to offset the temperature increase that results from the heat released as a result of the hydrogenation of the olefins of the less reactive fuel gas stream. This combination of diluting and quenching helps in the control of the exotherm that results from the further hydrogenation reactions that occur within the elongated reactor vessel as the mixture of hydrogenated, less reactive fuel gas stream and more reactive fuel gas stream passes through the remainder of the bed of hydrogenation catalyst or through other beds of hydrogenation catalyst contained in the elongated reactor vessel.

The second introduction point of the more reactive fuel gas stream can include more than one location along the elongated reactor vessel so as to provide for multiple introduction locations. This allows for the dilution and quenching to occur at multiple locations along the length of the bed of catalyst and for a better control of the heat that is released from the hydrogenation of the olefins contained in the more reactive fuel gas stream that is introduced into the elongated reactor vessel.

As earlier described herein, the reactive fuel gas streams of the inventive process can have significant concentration levels of light or lower olefin compounds, such as ethylene, propylene, butylenes and pentenes. More typically, the lower olefin compounds are predominantly those of the group consisting of ethylene and propylene. The less reactive fuel gas stream can include a minor light olefin concentration that is less than a major light olefin concentration of the more reactive fuel gas stream.

The minor light olefin concentration will, generally, be less than 10 volume percent (%) of the less reactive fuel gas stream and, thus, can be in the range of from 100 ppmv to 10 vol %. Typically, the range for the minor light olefin concentration of the less reactive fuel gas stream is from 0.1 vol % to 5 vol %, and, more typically, from 0.1 vol % to 4 vol %. Most typically, the minor light olefin concentration is in the range of from 0.1 vol % to 3 vol %. The butylenes and pentenes content of the less reactive fuel gas stream is typically less than 0.1 vol %, and, normally, their concentration in the less reactive fuel gas stream is less than 0.05 vol %.

The major light olefin concentration of the more reactive fuel gas stream should be greater than the minor light olefin concentration and can be in the range upwardly to 50 vol %. A more typical range for the major light olefin concentration is from 2 vol % to 45 vol %, and, most typically, from 3 vol % to 40 vol %. In most cases, the butylenes and pentenes content of the more reactive fuel gas stream is typically less than 0.5 vol %, more typically, less than 0.2 vol %, and, most typically, less than 0.1 vol %.

In one embodiment of the inventive process, both the less reactive fuel gas stream and more reactive fuel gas stream will be selected from one or more of the various refinery fuel gas streams as described earlier herein. It is known by those skilled in the art that these refinery fuel gas streams are gaseous at the conditions under which they are processed, and, typically, they are gaseous at the standard conditions of 15.56° C. (60° F.) and 1 atmosphere pressure.

The reactive refinery fuel gas streams of the inventive process may include significant concentrations of molecular hydrogen as well as the lower alkane hydrocarbons of the group consisting of methane, ethane, propane and minor amounts of butane and pentane. The hydrogen content of either the less reactive fuel gas stream or the more reactive fuel gas stream, or both, can be in the range upwardly to 30 vol %, or from 0.1 vol % to 25 vol %. Typically, the hydrogen content of a reactive fuel gas stream is in the range of from 1 vol % to 20 vol %. The methane content of a reactive fuel gas stream can be in the range upwardly to 95 vol %, or from 0.1 vol % to 90 vol %. The ethane content of a reactive fuel gas stream can be in the range upwardly to 30 vol %, or from 0.1 vol % to 25 vol %. The propane content of a reactive fuel gas stream is typically in the range upwardly to 10 vol %, but, in the special case of processing a coker unit propylene stream, the propane content can be exceptionally high and in the range of upwardly to 80 vol % of the particular stream. The butanes and pentanes are present in the reactive fuel gas streams in minor amounts, generally, with the butanes being present at concentrations of less than 10 vol % and the pentanes being present at concentrations of less than 2 vol %.

The reactive fuel gas streams further include a concentration of at least one sulfur compound which is from the group of organic sulfur compounds that include thiol compounds, thiophene compounds, disulfide compounds and carbonyl sulfide. The thiol compounds can include one or more of the various aliphatic mercaptans, such as, for example, methyl mercaptan, ethyl mercaptan, propyl mercaptan, butyl mercaptan, and amyl mercaptan, and aromatic mercaptans, such as, for example, phenyl mercaptan. The thiopheneic compounds can include thiophene and any of the benzothiophenes and substituted thiophenes.

The concentration of the mercaptans in the reactive fuel gas streams is generally in the range upwardly to 5000 ppmv (0.5 volume percent of the fuel gas stream). But, for the inventive process, the mercaptan concentration in the fuel gas stream to be treated will, typically, be more than 20 ppmv and in the range of from 20 ppmv to 3000 ppmv. More typically, the mercaptan concentration is in the range of from 40 ppmv to 2000 ppmv, and, most typically, from 45 ppmv to 1500 ppmv.

The organic sulfur compounds that include thiophenes, organic disulfides and carbonyl sulfide are the more difficult compounds to remove from a fuel gas streams by use of conventional sulfur removal methods. The concentration of the these organic sulfur compounds in the reactive fuel gas stream of the inventive process can, collectively, be in the range of from 1 ppmv to 500 ppmv, but, typically, the collective concentration of these organic sulfur compounds will be in the range of from 2 to 300 ppmv, and, more typically, from 3 to 200 ppmv. The specific concentration of the carbonyl sulfide in the fuel gas stream can be upwardly to 500 ppmv, and, more typically, from 1 to 300 ppmv.

The total concentration of all the organic sulfur compounds, including thiol compounds, thiophene compounds, disulfide compounds and carbonyl sulfide, contained in the reactive fuel gas streams of the inventive process is, typically, in the range of from 40 ppmv to 5000 ppmv. More typically, the total concentration of all the organic sulfur compounds contained in the reactive fuel gas streams to be treated is in the range of from 45 ppmv to 3000 ppmv, and, most typically, from 50 ppmv to 2000 ppmv.

One of the important features of the inventive process is that the total amount or weight of organic sulfur contained in the reactor effluent that is yielded from the elongated reactor vessel is significantly less than the total amount or weight of organic sulfur that is introduced into the elongated reactor vessel by the less reactive fuel gas stream and the more reactive fuel gas stream. A significant proportion of the organic sulfur introduced into the elongated reactor vessel is converted by hydrogenation into hydrogen sulfide, which provides the reactor effluent containing hydrogen sulfide ($H_2S$) that is yielded from the elongated reactor vessel.

It is desirable for the total amount of organic sulfur of the reactor effluent to be significantly less than the total amount of organic sulfur contained in the less reactive fuel gas stream and the more reactive fuel gas stream that are introduced into the elongated reactor vessel. Thus, the concentration of organic sulfur compounds in the reactor effluent is to be less than 40 ppmv, and, preferably, less than 35 ppmv. More preferably, the organic sulfur concentration of the reactor effluent is less than 30 ppmv, and, most preferably, less than 20 ppmv or even less than 10 ppmv. While it is recognized that there are practical limits as to how low the organic sulfur concentration to which the reactor effluent may be reduced, it is desirable to reduce the organic sulfur concentration to as low as is feasible.

The hydrodesulfurization catalyst used to fill the elongated reactor vessel to form the beds of hydrodesulfurization catalyst can be any suitable hydrogenation catalyst including conventional hydrodesulfurization catalysts that comprise a metal component on a support material. The metal component can include a Group VIB metal component or a Group VIII metal component, or both metal components. It is preferred for the hydrodesulfurization catalyst to comprise both a Group VIB metal component and a Group VIII metal component. The hydrodesulfurization catalyst can also include a promoter such as a phosphorous component.

The Group VIII metal component of the hydrodesulfurization catalyst composition is selected from those Group VIII metal or metal compounds that, in combination with the other components of the catalyst composition, suitably provide a hydrodesulfurization catalyst. The Group VIII metal can be selected from the group consisting of nickel, cobalt, palladium and platinum. Preferably, the Group VIII metal is either nickel or cobalt and, most preferably, the Group VIII metal is cobalt.

The Group VIII metal component contained in the hydrodesulfurization catalyst composition can be in the elemental form or in the form of a metal compound, such as, for example, oxides, sulfides and the like. The amount of Group VIII metal in the hydrodesulfurization catalyst composition can be in the range of from about 0.1 to about 6 weight percent elemental metal based on the total weight of the hydrodesulfurization catalyst composition. Preferably, the concentration of Group VIII metal in the hydrodesulfurization catalyst composition is in the range of from 0.3 weight % to 5 weight %, and, most preferably, the concentration is in the range of from 0.4 weight % to 4.5 weight %.

The Group VIB metal component of the hydrodesulfurization catalyst composition is selected from those Group VIB metal or metal compounds that, in combination with the other elements of the hydrodesulfurization catalyst composition, suitably provide a hydrodesulfurization catalyst. The Group VIB metal can be selected from the group consisting of chromium, molybdenum and tungsten. The preferred Group VIB metal is either molybdenum or chromium and, most preferred, it is molybdenum.

The Group VIB metal component contained in the hydrodesulfurization catalyst composition can be in the elemental form or in the form of a metal compound, such as, for example, oxides, sulfides and the like. The amount of Group VIB metal in the hydrodesulfurization catalyst composition can be in the range of from about 2 to about 25 weight percent elemental metal based on the total weight of the hydrodesulfurization catalyst composition. Preferably, the concentration of Group VIB metal in the hydrodesulfurization catalyst composition is in the range of from 6 weight % to 18 weight %, and, most preferably, the concentration is in the range of from 7 weight % to 16 weight %.

The support material of the hydrodesulfurization catalyst can be any material that suitably provides a support for the metal hydrogenation components of the hydrodesulfurization catalyst including porous refractory oxides. Examples of possible suitable porous refractory oxides include silica, magnesia, silica-titania, zirconia, silica-zirconia, titania, titania-alumina, zirconia-alumina, silica-titania, alumina, silica-alumina, and alumino-silicate. The alumina can be of various forms, such as, alpha alumina, beta alumina, gamma alumina, delta alumina, eta alumina, theta alumina, boehmite, or mixtures thereof. The preferred porous refractory oxide is amorphous alumina. Among the available amorphous aluminas, gamma alumina is most preferred.

The porous refractory oxide generally has an average pore diameter in the range of from about 30 Angstroms to about 500 Angstroms, preferably, from 50 Angstroms to 400 Angstroms, and, most preferably, from 60 Angstroms to 300 Angstroms. The total pore volume of the porous refractory oxide, as measured by standard mercury porosimetry methods, is in the range of from about 0.2 cc/gram to about 2 cc/gram. Preferably, the pore volume is in the range of from 0.3 cc/gram to 1.5 cc/gram, and, most preferably, from 0.4 cc/gram to 1 cc/gram. The surface area of the porous refractory oxide, as measured by the B.E.T. method, generally exceeds about 50 m$^2$/gram, and it is typically in the range of from about 100 to about 500 m$^2$/gram.

The temperature and pressure conditions within the elongated reactor vessel are controlled so as to provide suitable hydrodesulfurization reaction conditions for the hydrogenation of the organic sulfur compounds contained in the reactive fuel gas streams introduced into the elongated reactor vessel. In order to realize the optimum benefit from the inventive process, it is particularly desirable for the less reactive fuel gas stream to have a first introduction temperature and for the more reactive fuel gas stream to have a second introduction temperature, wherein the first introduction temperature is higher or greater than the second introduction temperature. This relative temperature difference provides for the quenching benefit that was earlier described herein.

The first introduction temperature of the less reactive fuel gas stream is in general in the range of from 150° C. (302° F.) to 480° C. (896° F.), preferably, from 200° C. (392° F.) to 430° C. (806° F.), and, most preferably, from 230° C. (446° F.) to 340° C. (644° F.). The second introduction temperature of the more reactive fuel gas stream is, on the other hand, less than the first introduction temperature and generally should be in the range of from 35° C. (95° F.) to 150° C. (302° F.), preferably, from 40° C. (104° F.) to 120° C. (248° F.), and, most preferably, from 45° C. (113° F.) to 110° C. (230° F.). The pressure within the elongated reactor vessel and at which the reactive fuel gas streams are contacted with the hydrodesulfurization catalyst should be in the range of from 30 psig to 600 psig, preferably, from 50 psig to 500 psig, and, most preferably, from 70 psig to 400 psig.

The flow rates at which the reactive fuel gas streams are charged to the elongated reactor vessel of the inventive process are generally such as to provide a gaseous hourly space velocity (GHSV) in the range of from 0.01 hr$^{-1}$ to 6000 hr$^{-1}$. The term "gaseous hourly space velocity", as used herein, means the numerical ratio of the rate at which the sum total of the reactive fuel gas streams, including added hydrogen, if any, that are charged to the elongated reactor vessel in volume (at standard temperature and pressure conditions) per hour divided by the volume of hydrodesulfurization catalyst contained in the elongated reactor vessel to which the reactive fuel gas streams are charged. The preferred GHSV is in the range of from 0.05 hr$^{-1}$ to 4000 hr$^{-1}$, more preferably, from 0.1 hr$^{-1}$ to 3500 hr$^{-1}$, and, most preferably, from 0.2 hr$^{-1}$ to 3200 hr$^{-1}$.

Because of the heat released from the hydrogenation reactions within the elongated reactor vessel, the reactor effluent will have a temperature that is significantly higher than either the first introduction temperature or the second introduction temperature, or both. It can be desirable to cool the reactor effluent by any suitable means known to those skilled in the art to thereby provide a cooled reactor effluent. It is preferable to recover a portion of the heat that is released by the hydrogenation reactions within the elongated reactor vessel and contained in the reactor effluent by exchanging the heat energy contained therein with at least a portion of the less reactive fuel gas stream being introduced into the elongated reactor vessel. This may be accomplished by the use of a feed/effluent heat exchanger that provides heat exchange means for exchanging heat energy between at least a portion of the less reactive fuel gas stream and at least a portion of the reactor effluent to thereby provide a cooled reactor effluent and a heated less reactive fuel gas stream. This exchange of heat can provide for the less reactive fuel gas stream having the first introduction temperature at which it is introduced into the elongated reactor vessel.

As a result of the hydroconversion of the organic sulfur of the reactive fuel gas streams to hydrogen sulfide, an additional embodiment of the inventive process includes the use of any suitable means or method for reducing the hydrogen sulfide content of either the reactor effluent or cooled reactor effluent, or portions thereof, so as to provide a treated fuel gas stream having a concentration of hydrogen sulfide of less than 100 ppmv. It is, however, desirable to provide a treated fuel gas stream that has a hydrogen sulfide concentration of less than 80 ppmv, and, more desirably, the hydrogen sulfide concentration of the treated fuel gas stream is less than 60 ppmv. It is especially desirable for the treated fuel gas stream to have a hydrogen sulfide concentration of less than 40 ppmv, and, more especially, less than 10 ppmv. This reduced concentration of hydrogen sulfide provides a treated fuel gas that will meet most of the more stringent sulfur regulations and that has a suitably low hydrogen sulfide concentration such that it may be combusted or burned in typical combustion devices or means for combusting or burning treated fuel gas. Examples of such combustion means include the burners that are used in refinery heaters, furnaces, flares, and other equipment.

A preferred method of treating the reactor effluent or cooled reactor effluent, or portions thereof, is to remove the H$_2$S by the use of traditional absorption scrubbing of the gas stream to remove the H$_2$S contained therein. This is done by contacting the reactor effluent or cooled reactor effluent, or portions thereof, with a suitable absorbent and yielding a treated fuel gas having a reduced concentration of H$_2$S and the absorbent that is rich in H$_2$S. Among the absorption processes that may suitably be used to treat the remaining portion of the cooled reactor effluent, amine treating is preferred. Amine treating includes the use of any known amine absorbents such as, for example, monoethanolamine (MEA), diethanolamine (DEA), methyldiethanolamine (MDEA), diisopropylamine (DIPA), and diglycolamine (DGA).

In one embodiment of the inventive process, a portion of the cooled reactor effluent can be recycled and introduced along with one of the reactive fuel gas streams to the elongated reactor vessel. The advantage to the use of this recycle stream in this manner is that it is essentially not reactive in that it contains essentially no olefins or organic sulfur compounds as a result of the hydrogenation and can thus be used as a diluent of either the less reactive fuel gas stream or the more reactive fuel gas stream or both of such reactive fuel gas streams. This use or recycling of the portion of the cooled reactor effluent allows for further control of the temperature across the bed of catalyst of the elongated reactor vessel. The amount of recycle, thus, can be adjusted to allow for the control and limitation of the temperature increase across the bed or beds of hydrogenation catalyst of the elongated reactor vessel. The portion of the cooled reactor effluent not recycled, i.e., the remaining portion of cooled reactor effluent, is passed to the hydrogen sulfide removal unit of the process by which hydrogen sulfide is removed therefrom to provide the treated fuel gas stream.

Reference is now made to the process flow schematic of FIG. 1, which includes for illustrative purposes various embodiments of the inventive process. Depicted in FIG. 1 is a fuel gas treating process 10 for processing more than one reactive fuel gas stream that contains organic sulfur and light olefins to remove the sulfur therefrom and yield a treated fuel gas stream having a low sulfur content and that is suitable for combustion. A less reactive fuel gas stream is fed to the fuel gas treating process 10 by way of conduit 12 and is passed to feed/effluent heat exchanger 14. The feed/effluent heat exchanger 14 provides for the exchange of heat energy between at least a portion of the less reactive fuel gas stream passing through conduit 12 and at least a portion of the reactor effluent passing from elongated reactor vessel 16 through conduit 18. The less reactive fuel gas stream that has been heated to a first introduction temperature by use of the feed/effluent heat exchanger 14 passes to the elongated reactor vessel by way of conduit 20 to the first introduction point 22 of the elongated reactor vessel 16.

The elongated reactor vessel 16 has a length 24 and has an inside wall that defines a volume that is filled with at least one bed of hydrodesulfurization catalyst including a first upper catalyst bed 26, comprising a first hydrodesulfurization catalyst, and second lower catalyst bed 28, comprising a second hydrodesulfurization catalyst. The first introduction point 22 into the elongated reactor vessel 16 is at a location that is preferably above the top surface 30 of the first upper catalyst bed 26. A more reactive fuel gas stream passes by way of conduit 32 and is introduced into the elongated reactor vessel 16 at a second introduction point of any one or more of a multiplicity of locations 34, 36, 38, 40, and 42 along the length 24 of the elongated reactor vessel 16 that are below the location of the first introduction point 22. The more reactive fuel gas stream may, for example, be introduced at a location 38 that is between the first upper catalyst bed 26 and the second lower catalyst bed 28, or it may be introduced into the bed 26 at locations 34 and 36, or it may be introduced into bed 28 at locations 40 and 42, or it may be introduced at any combination of locations 34, 36, 38, 40 and 42.

A cooled reactor effluent passes from the feed/effluent heat exchanger 14 by way of conduit 44. A portion of the cooled reactor effluent can be recycled by way of either conduit 46, or conduit 48, or conduit 50, to be introduced respectively along with the introduction of the less reactive fuel gas stream of conduits 20 or 12 or the introduction of the more reactive fuel gas stream of conduit 32. The remaining portion of the cooled reactor effluent, i.e., the cooled reactor effluent that is not recycled as a feed to the elongated reactor vessel 16, passes by way of conduit 52 to an absorption unit 54.

The absorption unit 54 provides for the removal of hydrogen sulfide that is contained in the remaining portion of the cooled reactor effluent by contacting it with a suitable absorbent fluid. A lean absorbent fluid is introduced to the absorption unit 54 through conduit 56 and a rich absorbent fluid containing hydrogen sulfide that is removed from the remaining portion of the cooled reactor effluent passes from the absorption unit 54 by way of conduit 58. A treated fuel gas having a significantly reduced concentration of hydrogen sulfide passes from the absorption unit 54 by way of conduit 60 to any suitable combustion device or means for burning or combusting the treated fuel gas, such as, for example, burners that are used in refinery heaters, furnaces, flares and other equipment.

That which is claimed is:

1. A process for removing sulfur from more than one fuel gas stream, wherein said process comprises:
   providing an elongated reactor vessel having a length and containing a bed of a hydrodesulfurization catalyst;
   introducing a less reactive fuel gas stream at a first introduction point into said elongated reactor vessel, wherein said less reactive fuel gas stream is contacted with said hydrodesulfurization catalyst under hydrodesulfurization process conditions;
   introducing a more reactive fuel gas stream at a second introduction point into said elongated reactor vessel at a location along said length of said elongated reactor vessel that is below said first introduction point; and
   yielding from said elongated reactor vessel a reactor effluent containing $H_2S$, wherein said less reactive fuel gas stream includes a minor light olefin concentration and a first organic sulfur concentration, and wherein said more reactive fuel gas stream includes a major light olefin concentration and a second organic sulfur concentration, and wherein said minor light olefin concentration is less than said major light olefin concentration.

2. A process as recited in claim 1, wherein said bed of said hydrodesulfurization catalyst includes at least two separate catalyst beds including a first upper catalyst bed, comprising a first hydrodesulfurization catalyst, and a second lower catalyst bed, comprising a second hydrodesulfurization catalyst; and wherein said first introduction point of said less reactive fuel gas stream provides for introducing of said less reactive fuel gas stream into said first upper catalyst bed and the contacting of said less reactive fuel gas stream with said first hydrodesulfurization catalyst of said first upper catalyst bed.

3. A process as recited in claim 2, further comprising:
   cooling said reactor effluent to provide a cooled reactor effluent.

4. A process as recited in claim 3, further comprising:
   recycling a portion of said cooled reactor effluent and introducing said portion with the introduction of said less reactive fuel gas stream into said elongated reactor vessel.

5. A process as recited in claim 4, wherein said cooling step includes:
   exchanging heat energy between at least a portion of said less reactive fuel gas stream and at least a portion of said reactor effluent by use of a feed/effluent heat exchanger to thereby provide said cooled reactor effluent prior to said introducing of said less reactive fuel gas stream that includes said at least a portion of said less reactive fuel gas stream into said elongated reactor vessel.

6. A process as recited in claim 5, further comprising:
   passing a remaining portion of said cooled reactor effluent to an absorption unit whereby said remaining portion of said cooled reactor effluent is treated to remove $H_2S$ therefrom to yield a treated fuel gas having a reduced concentration of $H_2S$.

7. A process as recited in claim 6, wherein said less reactive fuel gas stream is at a first introduction temperature and said more reactive fuel gas stream is at a second introduction temperature, and wherein said first introduction temperature is greater than said second introduction temperature.

8. A process as recited in claim 7, wherein the total amount of organic sulfur contained in said reactor effluent is significantly less than the total amount of organic sulfur contained in said less reactive fuel gas stream and said more reactive fuel gas stream.

9. A process as recited in claim 8, wherein said reactor effluent has a reactor effluent organic sulfur concentration such that there is less than 40 ppmw sulfur therein.

10. A process as recited in claim 1, further comprising:
    cooling said reactor effluent to provide a cooled reactor effluent.

11. A process as recited in claim 10, wherein said cooling step includes:
    exchanging heat energy between at least a portion of said less reactive fuel gas stream and at least a portion of said reactor effluent by use of a feed/effluent heat exchanger to thereby provide said cooled reactor effluent prior to said introducing of said less reactive fuel gas stream that includes said at least a portion of said less reactive fuel gas stream into said elongated reactor vessel.

12. A process as recited in claim 4, further comprising: passing a remaining portion of said cooled reactor effluent to an absorption unit whereby said remaining portion of said cooled reactor effluent is treated to remove $H_2S$ therefrom to yield a treated fuel gas having a reduced concentration of $H_2S$.

13. A process as recited in any one of claims 1 through 4 and 10 through 12 wherein said less reactive fuel gas stream includes a minor light olefin concentration and a first organic sulfur concentration, and wherein said more reactive fuel gas stream includes a major light olefin concentration and a second organic sulfur concentration, and wherein said minor light olefin concentration is less than said major light olefin concentration, and wherein said less reactive fuel gas stream is at a first introduction temperature and said more reactive fuel gas stream is at a second introduction temperature, and wherein said first introduction temperature is greater than said second introduction temperature.

14. A process as recited in any one of claims 1 through 4 and 10 through 12 wherein the total amount of organic sulfur contained in said reactor effluent is significantly less than the total amount of organic sulfur contained in said less reactive fuel gas stream and said more reactive fuel gas stream, and wherein said reactor effluent has a reactor effluent organic sulfur concentration such that there is less than 40 ppmw sulfur therein.

* * * * *